(12) United States Patent
Giardino et al.

(10) Patent No.: US 7,132,484 B2
(45) Date of Patent: *Nov. 7, 2006

(54) CONTINUOUS PROCESS FOR PRODUCING POLY (TRIMETHYLENE TEREPHTHALATE)

(75) Inventors: Carl J. Giardino, Hixson, TN (US); David B. Griffith, Victoria, TX (US); Chungfah Howard Ho, Kinston, NC (US); James M. Howell, Greenville, NC (US); Michelle Hoyt Watkins, Fishersville, VA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/093,092

(22) Filed: Mar. 29, 2005

(65) Prior Publication Data

US 2005/0165178 A1 Jul. 28, 2005

Related U.S. Application Data

(63) Continuation of application No. 10/373,587, filed on Feb. 25, 2003, now abandoned, which is a continuation of application No. 10/057,497, filed on May 22, 2001, now Pat. No. 6,538,076, which is a continuation of application No. 09/502,642, filed on Feb. 11, 2000, now abandoned.

(51) Int. Cl.
*C08F 2/00* (2006.01)

(52) U.S. Cl. .................. 526/65; 526/66; 526/67; 526/71; 528/274; 528/308.6; 528/481; 528/501; 528/503; 428/364; 428/480

(58) Field of Classification Search .................. 526/65, 526/66, 67, 71; 528/274, 308.6, 481, 501, 528/503; 428/364, 480
See application file for complete search history.

(56) References Cited

U.S. PATENT DOCUMENTS

| | | |
|---|---|---|
| 2,465,319 A | 3/1949 | Whinfield et al. |
| 2,727,882 A | 12/1955 | Vodonik |
| 2,829,153 A | 4/1958 | Vodonik ..................... 260/470 |
| 2,932,625 A | 4/1960 | Burton et al. ................ 260/75 |
| 2,933,476 A | 4/1960 | Fisher ......................... 260/75 |
| 2,973,341 A | 2/1961 | Hippe et al. ................. 260/75 |
| 3,054,776 A | 9/1962 | Higgins ....................... 260/75 |
| 3,167,531 A | 1/1965 | Parker et al. ................ 260/75 |
| 3,192,184 A | 6/1965 | Brill ............................ 260/75 |
| 3,438,942 A | 4/1969 | Scheller et al. ............. 260/75 |
| 3,506,622 A | 4/1970 | Higgins ....................... 260/75 |
| 3,609,125 A | 9/1971 | Fujimoto et al. ............ 260/75 |
| 3,676,485 A | 7/1972 | Lewis et al. ............. 260/475 P |
| 3,936,421 A | 2/1976 | Hayashi et al. ...... 260/45.75 K |
| 4,049,635 A | 9/1977 | Cleary ...................... 260/75 R |
| 4,056,514 A | 11/1977 | Strehler et al. ........... 260/75 R |
| 4,096,122 A | 6/1978 | Schade et al. ........... 260/75 M |
| 4,110,316 A | 8/1978 | Edging et al. ................ 526/68 |
| 4,289,895 A | 9/1981 | Burkhardt et al. ........... 560/92 |
| 5,340,909 A | 8/1994 | Doerr et al. ................ 528/276 |
| 5,434,239 A | 7/1995 | Bhatia ....................... 528/274 |
| 5,459,229 A | 10/1995 | Kelsey et al. ............... 528/275 |
| 5,466,776 A | 11/1995 | Krautstrunk et al. ......... 526/68 |
| 5,510,454 A | 4/1996 | Stouffer et al. .......... 528/308.1 |
| 5,540,868 A | 7/1996 | Stouffer et al. ............... 264/13 |
| 5,552,513 A | 9/1996 | Bhatia ..................... 528/308.3 |
| 5,559,205 A | 9/1996 | Hansen et al. ............. 528/279 |
| 5,599,900 A | 2/1997 | Bhatia ....................... 528/491 |
| 5,633,018 A | 5/1997 | Stouffer et al. ................. 425/8 |
| 5,663,281 A | 9/1997 | Brugel ....................... 528/272 |
| 5,670,606 A | 9/1997 | Stouffer et al. ............. 528/272 |
| 5,677,415 A | 10/1997 | Bhatia ....................... 528/176 |
| 5,688,898 A | 11/1997 | Bhatia ....................... 528/272 |
| 5,703,179 A | 12/1997 | Asakura et al. .............. 526/59 |
| 5,763,104 A | 6/1998 | Stouffer et al. ............. 528/503 |
| 5,786,443 A | 7/1998 | Lowe ......................... 528/272 |
| 5,798,433 A | 8/1998 | Schmidt et al. ............. 528/279 |
| 5,811,496 A | 9/1998 | Iwasyk et al. ............... 525/444 |
| 5,840,957 A | 11/1998 | Kurian et al. ................ 560/92 |
| 5,849,849 A | 12/1998 | Bhatia ....................... 525/444 |
| 5,891,985 A | 4/1999 | Brugel ....................... 528/283 |
| 5,990,265 A | 11/1999 | Blanchard et al. .......... 528/272 |
| 6,113,825 A | 9/2000 | Chuah |

| | | |
|---|---|---|
| 6,254,961 B1 | 7/2001 | Chuah |
| 6,255,442 B1 | 7/2001 | Kurian et al. |
| 6,277,947 B1 | 8/2001 | Kelsey et al. |
| 6,281,325 B1 | 8/2001 | Kurian et al. |
| 6,315,934 B1 | 11/2001 | Chuah |
| 6,326,456 B1 | 12/2001 | Kelsey et al. |
| 6,335,421 B1 | 1/2002 | Kurian et al. |
| 6,350,895 B1 | 2/2002 | Kurian |
| 6,353,062 B1 | 3/2002 | Giordino et al. |
| 6,512,080 B1 | 1/2003 | Kelsey et al. |
| 6,538,076 B1 * | 3/2003 | Giardino et al. ............... 526/65 |
| 6,657,044 B1 * | 12/2003 | Kelsey et al. ............... 528/485 |
| 2002/0012763 A1 | 1/2002 | Chuah |

FOREIGN PATENT DOCUMENTS

| | | |
|---|---|---|
| DE | 197 05 249 A1 | 8/1998 |
| EP | 0 745 711 B1 | 11/2001 |
| EP | 1 046 662 A1 | 3/2003 |
| EP | 1 261 658 B1 | 10/2003 |
| WO | 97/21754 | 6/1997 |
| WO | WO99/54040 | 10/1999 |
| WO | WO 00/64962 A1 | 11/2000 |
| WO | 01/58982 | 8/2001 |

OTHER PUBLICATIONS

PCT International Search Report mailed Nov. 16, 2000.
Traub et al., Mechanical Properties of Fibers Made of Polytrimethylene Terephthalate, *Chemical Fibers International*, 45, 110-111, Apr. 1995.
Schauhoff et al.,, New Developments in the Production of Polytrimethylene Terephthalate (PTT), *Man-Made Fiber Year Book*, Sep. 1996.
Stefan Deiβ, Zimmer AG PTT Processes, Lurgi Zimmer.
Observations Regarding European Patent EP-B-1 261 658 In Response To Notice Of Opposition.
OPPOSITION in the name of Zimmer Aktiengesellschaft against the European Patent 1 261 658 B1.
OPPOSITION in the name and on behalf of Solotex Corporation against the European Patent 1 261 658 B1.
Certified Experimental Results, D6 from the Solotex Opposition.
Value table of the correlation between the relative viscosity and intrinsic viscosity of a poly(trimethylene terephthalate), with extrapolation by quadratic equation, D3 of the Zimmer Opposition.
Romp Chemie Lexicon, 9th Ed., vol. 5, pp. 3832-3833 (1992).
Schauhoff/Schmidt in Chem. Fibers Int. 46, pp. 263 and 264 (1996).
H. L. Traub, et al. "Synthesis and properties of fiber-grade poly(trimethylene terephthalate)", Die Angewandte Makromolekulane Chemie 230 (1995) 179-187 (Nr. 4055).
Product data sheet Tyzor PTP (Du Pont) May 1997.
DuPont Tyzor Organic Titanates Product Information (2001).
OPPOSITION in the name of Zimmer Aktiengesellschaft against the European Patent 1 259 558.
Ullmann's Encyclopedia of Industrial Chemistry, 5$^{th}$ complete rev. ed., vol.B3: Unit Operations, 2, Evaporation 3-11-3-15. D10 of the Zimmer Opposition against EP 1 259 558.

* cited by examiner

*Primary Examiner*—Samuel A. Acquah
(74) *Attorney, Agent, or Firm*—Mark D. Kuller; Bart E. Lerman

(57) ABSTRACT

A continuous process for the production of poly(trimethylene terephthalate) is disclosed. According to the process, a liquid feed mixture comprising bis-3-hydroxypropyl terephthalate and/or low molecular weight polyesters of 1,3-propanediol and terephthalic acid, the liquid feed mixture having a mole ratio of propylene groups to terephthalate groups of 1.1 to 2.2 is fed to a flasher. A first stream of gaseous by-products is continuously vaporized and removed from the flasher, and a liquid flasher reaction product having a mole ratio of propylene groups to terephthalate groups of less than about 1.5 is continuously withdrawn from the flasher. The liquid flasher reaction product is continuously fed to a prepolymerizer where it is continuously polymerized to form a poly(trimethylene terephthalate) prepolymer and a second stream of gaseous by-products. Poly(trimethylene terephthalate) prepolymer having a relative viscosity of at least about 5 is continuously withdrawn from the prepolymerizer and continuously fed to a final polymerizer, where it is continuously polymerized to form a higher molecular weight poly(trimethylene terephthalate) and a third stream of gaseous by-products. Higher molecular weight poly(trimethylene terephthalate) having a relative viscosity of at least about 17 is continuously withdrawn from the final polymerizer.

37 Claims, 1 Drawing Sheet

CONTINUOUS PROCESS FOR PRODUCING POLY (TRIMETHYLENE TEREPHTHALATE)

CROSS REFERENCE TO RELATED APPLICATIONS

This application is a continuation of U.S. patent application Ser. No. 10/373,587, filed Feb. 25, 2003, now abandoned; which is a continuation of U.S. patent application Ser. No. 10/057,497, filed May 22, 2001, now U.S. Pat. No. 6,538,076; which is a continuation of U.S. patent application Ser. No. 09/502,642, filed Feb. 11, 2000, now abandoned.

FIELD OF THE INVENTION

The present invention relates to a continuous process for the production of poly(trimethylene terephthalate), which is also commonly referred to as poly(1,3-propylene terephthalate). The process of the invention can be used as part of a four-vessel process, the first vessel being either an ester exchanger for producing a mixture of bis-3-hydroxypropyl terephthalate and low molecular weight polymers of 1,3-propanediol and terephthalic acid having an average degree of polymerization of 15 or less from dimethylterephthalate and 1,3-propanediol or a reactor for producing the starting material from terephthalic acid and 1,3-propanediol. The second vessel is a flasher, the third vessel is a prepolymerizer, and the fourth vessel is a final polymerizer or finisher.

BACKGROUND OF THE INVENTION

Continuous, four vessel processes for the production of poly(ethylene terephthalate) are known. For example, Sheller, U.S. Pat. No. 3,438,942 discloses a process for the continuous production of poly(ethylene terephthalate) comprising ester exchange followed by three polycondensation steps.

Also known are batch processes for the production of poly(trimethylene terephthalate). For example, Doerr et al., U.S. Pat. No. 5,340,909 discloses the production of poly (trimethylene terephthalate) using either an ester exchange reaction starting with lower dialkyl terephthalate ester or direct esterification of terephthalic acid followed by a polycondensation reaction, both of which are carried out in batches using an autoclave.

It would be highly desirable to provide a continuous, four-vessel process for the production of poly(trimethylene terephthalate). It would also be desirable to provide a continuous process for the production of poly(trimethylene terephthalate) in which the production of by-products, such as acrolein and allyl alcohol, is minimized, and in which the molecular weight of the final poly(trimethylene terephthalate) polymer is maximized. The present invention provides such a process.

SUMMARY OF THE INVENTION

The present invention comprises a continuous process for the production of poly(trimethylene terephthalate) comprising the steps of:
(a) continuously feeding a liquid feed mixture to a flasher, the liquid feed mixture comprising a catalyst and at least one of bis-3-hydroxypropyl terephthalate and low molecular weight polyesters of 1,3-propanediol and terephthalic acid, and the liquid feed mixture having a mole ratio of propylene groups to terephthalate groups of 1.1 to 2.2;
(b) continuously vaporizing and removing a first stream of gaseous by-products from the flasher, and continuously withdrawing a liquid flasher reaction product having a mole ratio of propylene groups to terephthalate groups of less than about 1.5 from the flasher;
(c) continuously feeding the liquid flasher reaction product to a prepolymerizer, and continuously polymerizing the flasher reaction product in the prepolymerizer to form a poly(trimethylene terephthalate) prepolymer and a second stream of gaseous by-products;
(d) continuously withdrawing the poly(trimethylene terephthalate) prepolymer from the prepolymerizer, the prepolymer having a relative viscosity of at least about 5;
(e) continuously feeding the poly(trimethylene terephthalate) prepolymer to a final polymerizer, and continuously polymerizing the poly(trimethylene terephthalate) prepolymer to form a higher molecular weight poly(trimethylene terephthalate) and a third stream of gaseous by-products; and
(f) continuously withdrawing the higher molecular weight poly(trimethylene terephthalate) from the final polymerizer, the higher molecular weight poly(trimethylene terephthalate) having a relative viscosity of at least about 17.

DETAILED DESCRIPTION OF THE INVENTION

Figure 1:
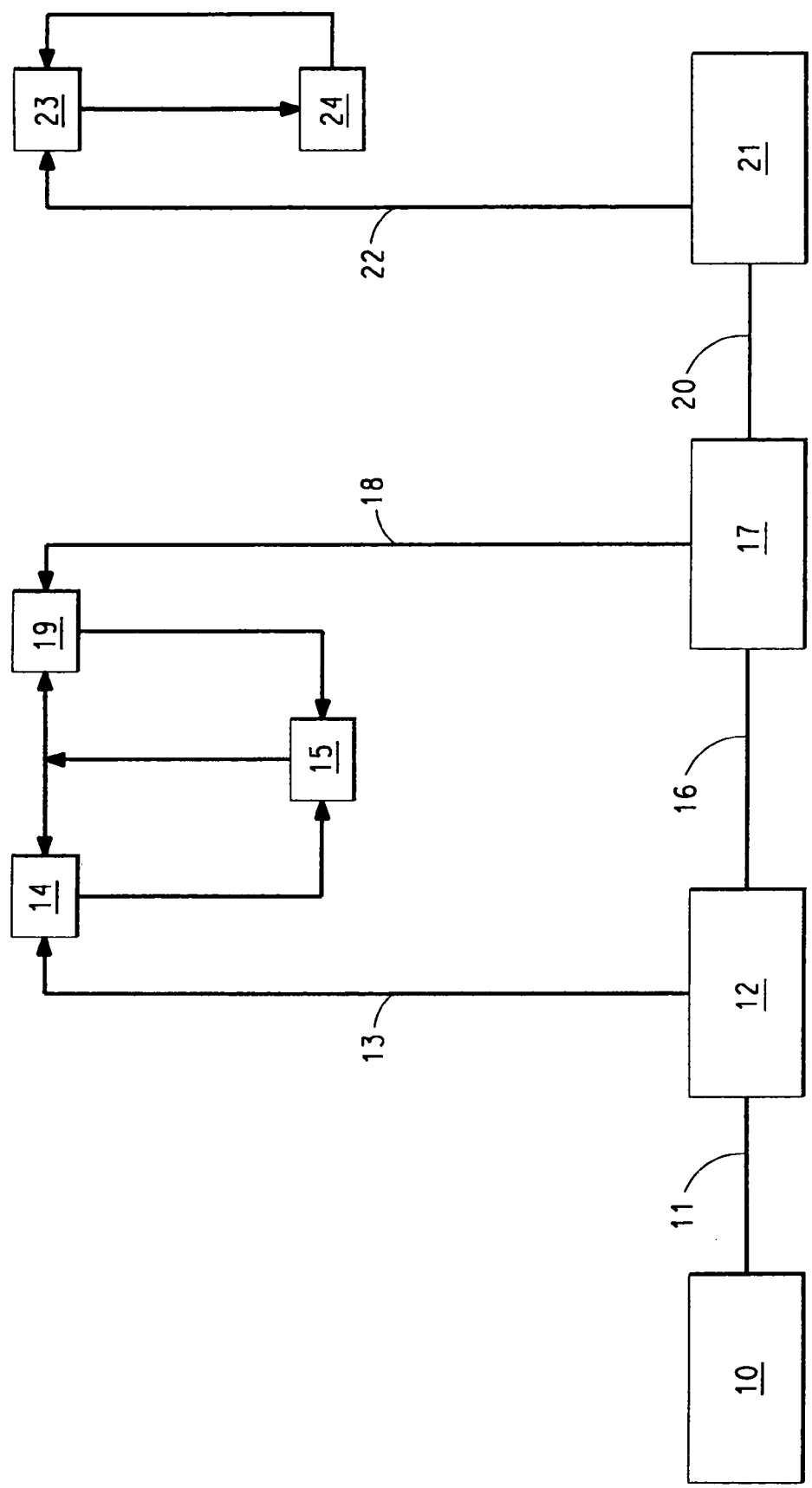
FIG. 1 is a schematic representation of an apparatus useful in carrying out the process of the invention.

The process of the invention is part of a continuous, four-vessel, four-stage process for the production of poly (trimethylene terephthalate). The first stage in the process is either an ester exchange or direct esterification reaction, depending upon whether the starting material for the process is dimethylterephthalate or terephthalic acid. The second stage is the rapid removal of 1,3-propanediol in a flasher, the third stage is a prepolymerization, and the fourth stage is a final polymerization. The present invention is useful for the production of poly(trimethylene terephthalate) containing low levels of toxic byproducts such as acrolein and allyl alcohol.

The term "ppm" is used herein to mean parts per million and is equal to micrograms per gram.

1. Production of Feed Materials

The feed material for the flasher may be produced either by ester exchange from dimethylterephthalate and 1,3-propanediol or by direct esterification from terephthalic acid and 1,3-propanediol. Both processes yield bis-3-hydroxypropyl terephthalate (referred to as "monomer") and low molecular weight polyesters of 1,3-propanediol and terephthalic acid having an average degree of polymerization of 15 or less (referred to as "oligomers").

As shown in FIG. 1, reaction vessel 10 is a source of monomer and/or oligomers, which are fed to flasher 12. Reaction vessel 10 can be either an ester exchange reactor or a direct esterification reactor.

Whether the monomer/oligomer feed mixture is produced by direct esterification from terephthalic acid or ester exchange from dimethylterephthalate, a catalyst is added prior to the esterification or transesterification reaction. Catalysts useful in the ester exchange process include organic and inorganic compounds of titanium, lanthanum, and zinc. Titanium catalysts, such as tetraisopropyl titanate and tetraisobutyl titanate are preferred and are added to the 1,3-propanediol in an amount sufficient to yield 20 to 90 ppm of titanium by weight based on the finished polymer. These levels produce relatively low unreacted dimethylterephthalate in the ester exchange reaction (less than 5% by weight based on the total weight of the exit stream from the ester exchange), give reasonable reaction rates in the prepolymerization and final polymerization steps, and produce polymer with CIELAB b* color of less than 8 as measured by the CIE 1976 CIELAB color scale as standardized by CIE, the Commission International de L'Eclairage. The b-value shows the degree of yellowness, with a higher value showing a higher (undesirable) degree of yellowness. Another useful ester exchange catalyst is lanthanum acetate, which may be added in an amount sufficient to yield 125 to 250 ppm of lanthanum by weight based on the finished polymer. Following the ester exchange reaction, the lanthanum is deactivated by the addition of phosphoric acid in an amount sufficient to yield 10 to 50 ppm of phosphorus by weight based on the finished polymer. Tetraisopropyl titanate or tetraisobutyl titanate is then added as a polycondensation catalyst in an amount sufficient to yield 10 to 50 ppm of titanium by weight based on the finished polymer. Amounts of other ester exchange catalysts are adjusted to give the same effect as the 20 to 90 ppm of titanium.

Catalysts useful in the direct esterification process include organo-titanium and organo-tin compounds, which are added to the 1,3-propanediol in an amount sufficient to yield at least 20 ppm of titanium, or at least 50 ppm of tin, respectively, by weight based on the finished polymer.

Additional catalyst may be added to the monomer/oligomer mixture after the ester exchange or direct esterification reaction and prior to prepolymerization.

Whether the monomer/oligomer feed mixture is produced by direct esterification from terephthalic acid or ester exchange from dimethylterephthalate, the mole ratio of propylene groups to terephthalate groups is maintained at about 1.1 to 2.2, preferably about 1.4 to 1.8, and more preferably about 1.5 entering the flasher.

2. Flasher

As shown in FIG. 1, the monomer/oligomer mixture is pumped from the ester exchanger or direct esterification reactor to flasher 12 by means of a temperature-controlled feed line 11 equipped with pumps and filters. In the feed lines, the monomer/oligomer mixture is maintained at a temperature of about 215° to 250° C.

The flasher is a jacketed and heated vessel with an internal heater. The internal heater heats and vaporizes the excess 1,3-propanediol in the feed material. The bubbling of the 1,3-propanediol vapor provides the needed agitation. The excess 1,3-propanediol is removed through vapor line 13 connected to a vacuum source and then condensed. In the flasher, the monomer/oligomer mixture is maintained at a temperature of about 235° to 250° C., preferably about 240° to 245° C., and more preferably about 245° C. The pressure in the flasher is maintained at about 40 to 80 mm of Hg (5332 to 10,664 Pa), preferably about 45 to 75 mm Hg (5998 to 9998 Pa), and more preferably about 50 to 70 mm of Hg (6665 to 9331 Pa).

In the flasher, the monomer/oligomer mixture reacts to form a liquid flasher reaction product comprising a low molecular weight trimethylene terephthalate polymer and releasing 1,3-propanediol as a by-product. The excess 1,3-propanediol is vaporized and continuously removed from the liquid reactants, lowering the 1,3-propanediol to dimethylterephthalate mole ratio to less than about 1.5, preferably less than about 1.3, in the liquid flasher reaction product.

The excess 1,3-propanediol that is removed from the flasher can be condensed by means of spray condenser 14. Vapors from vapor line 13 pass into a vertical condenser, where they are sprayed with condensed 1,3-propanediol that has been cooled to a temperature of less than 60° C., preferably less than 50° C. The condensed 1,3-propanediol vapors from flasher 12, together with the 1,3-propanediol spray, flow into hotwell 15 located beneath condenser 14, where they are combined with additional 1,3-propanediol. A portion of the liquid mixture in hotwell 14 is pumped through a cooler to the top of the condenser for use as the condensing spray. The condensed vapors from flasher 12 are combined with the condensed vapors from prepolymerizer 17 in hotwell 15.

3. Prepolymerization

As shown in FIG. 1, the flasher reaction product is fed via temperature-controlled feed line 16 to prepolymerizer 17. Prepolymerizer 17 performs the initial polymerization step, which involves removing excess 1,3-propanediol and increasing the product viscosity by building longer chain molecules of polymer.

The prepolymerizer is a jacketed and heated vessel with an internal agitator. The agitator provides agitation and creates liquid/vapor surface area for 1,3-propanediol removal. The temperature of liquid reactants in the prepolymerizer is maintained at about 240° to 255° C., preferably about 245° to 250° C., and more preferably about 250° C. The pressure in the prepolymerizer is maintained at about 5 to 30 mm of Hg (666 to 3999 Pa), preferably about 10 to 20 mm of Hg (1333 to 2666 Pa), and more preferably about 15 mm of Hg (1999 Pa).

The excess 1,3-propanediol is removed through vapor line 18 connected to a vacuum source and then condensed. One method for condensing the 1,3-propanediol vapors from the prepolymerizer is by means of spray condenser 19 similar to that described above for condensing 1,3-propanediol vapors from the flasher. The condensed vapors from prepolymerizer 17 are combined with the condensed vapors from flasher 12 in hotwell 15.

The condensed 1,3-propanediol vapors exiting the flasher and prepolymerizer typically contain other reaction by-products such as acrolein and allyl alcohol. It is desirable that the production of by-products such as acrolein and allyl alcohol be minimized because both of these compounds are highly toxic and cause irritation to the eyes and mucous membranes. According to the process of the invention, the amount of acrolein contained in the combined condensed 1,3-propanediol streams exiting the flasher and prepolymerizer is no greater than 100 ppm by weight of condensate, preferably no greater than 60 ppm, and more preferably no greater than 40 ppm. The amount of allyl alcohol contained in the combined condensed 1,3-propanediol streams exiting the flasher and prepolymerizer is no greater than 600 ppm by weight of condensate, preferably no greater than 400 ppm, and more preferably no greater than 250 ppm.

Relative viscosity is an indicator of molecular weight. Relative viscosity, often referred to as "LRV," is the ratio of the viscosity of a solution of 4.75 grams of poly(trimethylene terephthalate) in 100 grams of solution to the viscosity of the solvent itself. The solvent used herein for measuring relative viscosity is hexafluoroisopropanol containing 100 ppm sulfuric acid, and the measurements are made at 25° C.

The poly(trimethylene terephthalate) prepolymer that is withdrawn from the prepolymerizer has a relative viscosity of at least about 5, preferably about 5.5 to 7.

The residence or hold-up time in the prepolymerizer typically ranges from about 30 to 90 minutes.

4. Final Polymerization

As shown in FIG. 1, the liquid reaction product from prepolymerizer 17 is fed via temperature-controlled feed line 20 to final polymerizer or finisher 21. The major purpose of finisher 21 is to increase the molecular chain length or viscosity of the polymer. This is accomplished by using heat, agitation, vacuum and catalyst. It is desirable that the molecular weight of the finished polymer be maximized, so that further processing, e.g., solid state polymerization, can be avoided prior to fiber spinning or other forming operation.

The finisher is normally a horizontal cylindrical vessel surrounded by a jacket containing a heating medium, such as Dowtherm vapor. Prepolymer from prepolymerizer 17 flows through an inlet into the finisher. An agitator generates large surface areas of thin films of polymer to enhance the mass transfer of 1,3-propanediol from the polymer.

The temperature of the liquid reactants in the finisher is maintained at about 245° to 265° C., preferably about 250° to 260° C., and more preferably about 255° C. The pressure in the finisher is maintained at about 0.5 to 3.0 mm Hg (66 to 399 Pa).

Finished polymer is removed from the finisher through an outlet by means of a pump. The relative viscosity of the poly(trimethylene terephthalate) exiting the finisher is at least about 17, preferably at least about 35, more preferably at least about 40, more preferably at least about 45, and most preferably at least about 50. When correlated to intrinsic viscosity measurements in 60/40 weight percent phenol/1,1,2,2-tetrachloroethane following ASTM D 4603-96, these relative viscosities correspond to intrinsic viscosities of 0.55 dl/g, 0.85 dl/g, 0.91 dl/g, 0.96 dl/g, and 1.0 dl/g, respectively. The viscosity of the finished polymer may be controlled by adjusting finisher pressure or other variables. The residence or hold-up time in the finisher is typically about 1 to 2 hours.

1,3-Propanediol and other gaseous by-products are removed from the finisher through vapor line 22 connected to a vacuum source and then condensed. One method for condensing the 1,3-propanediol vapors from the finisher is by means of spray condenser 23 similar to that described above for condensing 1,3-propanediol vapors from the flasher and prepolymerizer. The condensed vapors from finisher 21 are collected in hotwell 24.

According to the present invention, the amount of acrolein contained in the condensed 1,3-propanediol stream exiting the finisher is no greater than 200 ppm by weight of condensate, preferably no greater than 100 ppm, and more preferably no greater than 70 ppm. The amount of allyl alcohol contained in the condensed 1,3-propanediol stream exiting the finisher is no greater than 3000 ppm, preferably no greater than 2500 ppm, and more preferably no greater than 1000 ppm.

The finished polymer may be pelletized or fed directly to a forming operation, such as fiber spinning, film formation or molding operation. Fibers made from the poly(trimethylene terephthalate) produced by the process of the invention have properties which make them useful in various textile applications, including the manufacture of carpet or apparel.

5. Additives

Various additives may be used in the process of the invention. These include color inhibitors, such as phosphoric acid, delustrants, such as titanium dioxide, dyeability modifiers, pigments and whiteners. If separate ester exchange and polymerization catalysts are used, phosphoric acid ($H_3PO_4$) or other color inhibitors may be added to minimize or prevent the color forming property of the ester exchange catalyst.

EXAMPLES 1 TO 10

Poly(trimethylene terephthalate) was prepared using an apparatus of the type indicated in the drawing, including an ester exchanger, a flasher, a prepolymerizer and a finisher. In Examples 1–8, a 94.1 lb./hr (42.7 kg/hr) stream of dimethylterephthalate was preheated to a temperature of 185° C. and continuously mixed with a 55.3 lb./hr (25.1 kg/hr) stream of catalyzed 1,3-propanediol which was also preheated to a temperature of 185° C., to form a mixture having a mole ratio of 1.5 moles of 1,3-propanediol per mole of dimethylterephthalate. In Example 9, the throughput was lowered to 51.4 lb./hr (23.3 kg/hr) of dimethylterephthalate and 40.3 lb./hr (18.3 kg/hr) of catalyzed 1,3-propanediol which were combined to form a mixture having a mole ratio of 2.0 moles of 1,3-propanediol per mole of dimethylterephthalate. In Example 10, the throughput was lowered still further to 38.2 lb./hr (17.3 kg/hr) of dimethylterephthalate and 30.0 lb./hr (13.6 kg/hr) of catalyzed 1,3-propanediol which were combined to form a mixture having a mole ratio of 2.0 moles of 1,3-propanediol per mole of dimethylterephthalate. The catalyst was tetraisopropyl titanate (Tyzor® TPT, available from E. I. du Pont de Nemours and Company, Wilmington, Del.). In Examples 1–8, the tetraisopropyl titanate was added to the 1,3-propanediol in an amount sufficient to yield 30–60 ppm by weight of titanium based on the weight of poly(trimethylene terephthalate) formed in the process. In Examples 9 and 10, the catalyst level was raised to 70 ppm of titanium. The dimethylterephthalate/catalyzed 1,3-propanediol mixture was fed into the base of an ester exchanger, where the pressure at the base of the ester exchanger was maintained at 825 to 900 mm of Hg (109,972 to 119,970 Pa). In Examples 1–8, the temperature of the liquid reactants in the ester exchanger was maintained at 230° C., and in Examples 9 and 10, the temperature of liquid reactants in the ester exchanger was maintained at 237° C. and 239° C., respectively. The pressure at the top of the ester exchange column was atmospheric. In the ester exchanger, the 1,3-propanediol reacted with the dimethylterephthalate to form bis-3-hydroxypropyl terephthalate monomer and low molecular weight oligomers of 1,3-propanediol and terephthalic acid, liberating methanol vapor, which was continuously removed from the top of the ester exchanger. The monomer/oligomer mixture was continuously removed from the base of the ester exchanger and fed to the inlet of a flasher. In the flasher, the monomers and oligomers reacted to form a low molecular weight trimethylene terephthalate polymer, liberating 1,3-propanediol vapor. The 1,3-propanediol vapor and other gaseous by-products were removed from the top of the flasher and condensed. The low molecular weight trimethylene terephthalate polymer was continuously withdrawn from the flasher and fed to the inlet end of a prepolymerizer. In the prepolymerizer, the monomers and oligomers further reacted to form a higher molecular weight poly(trimethylene terephthalate) prepolymer, liberating 1,3-propanediol vapor. The 1,3-propanediol vapor and other gaseous by-products were removed from the top of the prepolymerizer, condensed and combined with the condensates from the flasher. The poly(trimethylene terephthalate) prepolymer was continuously withdrawn from the prepolymerizer and fed to the inlet end of a finisher vessel. The temperature of the liquid reactants in the finisher was maintained at 255° to 260° C. In the finisher, the poly(trimethylene terephthalate) prepolymer reacted to form an even higher molecular weight polymer, liberating additional 1,3-propanediol vapor. The 1,3-propanediol vapor and other gaseous by-products were continuously removed from the finisher. The poly(trimethylene terephthalate) was continuously removed from the finisher and pelletized. The conditions and results for the continuous polymerization are set forth in Tables I, II and III. In Examples 9 and 10, the levels of polymer and hold-up times in the finisher were reduced, resulting in lower by-product formation and higher relative viscosity (LRV).

In the Tables, the acrolein and allyl alcohol levels are given in parts per million (ppm) by weight based on the combined condensates that are removed from the flasher and prepolymerizer and the condensates that are removed from the finisher, respectively. The dipropylene glycol (DPG) levels are given as a weight percent based on the total prepolymer or finished polymer that is removed from the flasher, prepolymerizer and finisher, respectively. The speed of the agitator in the finisher is given in revolutions per minute (RPM). The amount of carboxyl end groups (COOH) in the finished polymer is given in microequivalents per gram based on the total weight of the finished polymer. The level of catalyst is given as parts per million (ppm) by weight of titanium in the finished polymer.

TABLE I

| | | FLASHER | | | | |
|---|---|---|---|---|---|---|
| EXAMPLE | CATALYST Ti (ppm) | Temperature (° C.) | Pressure mm Hg (Pa) | 3G/T mole ratio | COOH Microeq./g | DPG (wt. %) |
| 1 | 50 | 245 | 60 (7998) | 1.22 | 1.9 | 0.18 |
| 2 | 40 | 245 | 60 (7998) | 1.29 | 1.8 | 0.16 |
| 3 | 50 | 245 | 60 (7998) | 1.08 | 1.4 | 0.15 |
| 4 | 60 | 245 | 60 (7998) | 1.24 | 1.4 | 0.14 |
| 5 | 50 | 245 | 60 (7998) | 1.18 | 1.4 | 0.13 |
| 6 | 30 | 245 | 60 (7998) | 1.09 | 2.9 | 0.14 |
| 7 | 30 | 245 | 60 (7998) | 1.19 | 1.6 | 0.14 |
| 8 | 30 | 245 | 60 (7998) | 1.17 | 1.3 | 0.13 |
| 9 | 70 | 245 | 50 (6665) | 1.51 | 2.6 | |
| 10 | 70 | 245 | 50 (6665) | 1.42 | 5.6 | |

TABLE II

| | PREPOLYMERIZER | | | | | FLASHER/PREPOLYMERIZER | |
|---|---|---|---|---|---|---|---|
| EXAMPLE | Temp. (° C.) | Pressure mm Hg (Pa) | LRV | DPG (wt. %) | COOH microeq./g | Acrolein (ppm) | Allyl Alcohol (ppm) |
| 1 | 250 | 15 (1999) | 6.7 | 0.19 | 2.3 | 15 | 410 |
| 2 | 250 | 15 (1999) | 6.6 | 0.16 | 2.4 | 107 | 516 |
| 3 | 250 | 15 (1999) | 6.7 | 0.16 | 2.0 | 62 | 453 |
| 4 | 250 | 15 (1999) | 5.9 | 0.15 | 2.2 | 69 | 526 |
| 5 | 250 | 30 (3999) | 5.5 | 0.14 | 1.6 | 39 | 544 |
| 6 | 250 | 39 (5199) | 5.0 | 0.15 | 1.8 | 76 | 565 |
| 7 | 250 | 20 (2666) | 5.9 | 0.14 | 1.7 | 56 | 568 |
| 8 | 250 | 40 (5332) | 5.4 | 0.13 | 1.5 | 90 | 525 |
| 9 | 250 | 15 (1999) | 5.7 | | 3.4 | 66 | 294 |
| 10 | 250 | 15 (1999) | 5.9 | | 3.1 | 63 | 299 |

TABLE III

| | FINISHER | | | | | | | |
|---|---|---|---|---|---|---|---|---|
| EXAMPLE | Temp. (° C.) | Pressure mm Hg (Pa) | Agitator Speed (rpm) | LRV | DPG (wt. %) | COOH (microeq./g) | Acrolein (ppm) | Allyl Alcohol (ppm) |
| 1 | 255 | <5 (<666) | 3 | 35 | 0.20 | 19 | 136 | 2848 |
| 2 | 255 | <5 (<666) | 3 | 35 | 0.23 | 20 | 77 | 2890 |
| 3 | 255 | <5 (<666) | 3.6 | 35 | 0.20 | 19 | 129 | 2778 |
| 4 | 255 | <5 (<666) | 3.6 | 35 | 0.19 | 22 | 0 | 2400 |
| 5 | 255 | <5 (<666) | 4 | 31 | 0.17 | 12 | 85 | 2569 |
| 6 | 255 | <5 (<666) | 4 | 31 | 0.18 | 12 | 0 | 2551 |
| 7 | 260 | <5 (<666) | 4 | 30 | 0.17 | 15 | 93 | 2674 |

TABLE III-continued

| | | | FINISHER | | | | | |
|---|---|---|---|---|---|---|---|---|
| EXAMPLE | Temp. (° C.) | Pressure mm Hg (Pa) | Agitator Speed (rpm) | LRV | DPG (wt. %) | COOH (microeq./g) | Acrolein (ppm) | Allyl Alcohol (ppm) |
| 8 | 260 | <5 (<666) | 4 | 32 | 0.17 | 18 | 0 | 3093 |
| 9 | 255 | 1.4 (187) | 2 | 46 | | 11 | 26 | 413 |
| 10 | 255 | 1.4 (187) | 2 | 52 | | 12 | 25 | 427 |

The invention claimed is:

1. A process comprising:
 (a) continuously flashing a liquid feed mixture comprising a catalyst and at least one of bis-3-hydroxypropyl terephthalate and low molecular weight polyesters containing propylene groups from 1,3-propanediol and terephthalate groups to form gaseous by-products and liquid reaction product, wherein gaseous by-products continuously exit the flashing;
 (b) continuously withdrawing liquid reaction product from the flashing; and
 (c) continuously prepolymerizing the liquid reaction product to form poly(trimethylene terephthalate) prepolymer.

2. The process of claim 1, wherein the liquid feed mixture is fed to the flashing and has a mole ratio of propylene groups to terephthalate groups of 1.1 to 2.2.

3. The process of claim 1, wherein the liquid reaction product withdrawn from the flashing has a mole ratio of propylene groups from 1,3-propanediol to terephthalate groups of less than about 1.5.

4. The process of claim 2, wherein the liquid reaction product withdrawn from the flashing has a mole ratio of propylene groups from 1,3-propanediol to terephthalate groups of less than about 1.5.

5. The process of claim 1, wherein the prepolymer has a relative viscosity of at least about 5.

6. The process of claim 5, wherein the prepolymer has a relative viscosity of about 5 to 7.

7. A process comprising:
 (a) continuously flashing a liquid feed mixture comprising a catalyst and at least one of bis-3-hydroxypropyl terephthalate and low molecular weight polyesters containing propylene groups from 1,3-propanediol and terephthalate groups, to form gaseous by-products and liquid reaction product, wherein gaseous by-product continuously exits the flashing;
 (b) continuously prepolymerizing the liquid reaction product to form poly(trimethylene terephthalate) prepolymer; and
 (c) continuously polymerizing the poly(trimethylene terephthalate) prepolymer to form a higher molecular weight poly(trimethylene terephthalate).

8. The process of claim 7, wherein the liquid feed mixture has a mole ratio of propylene groups from 1,3-propanediol to terephthalate groups of 1.1 to 2.2.

9. The process of claim 7, wherein the liquid reaction product withdrawn from the flashing has a mole ratio of propylene groups from 1,3-propanediol to terephthalate groups of less than about 1.5.

10. The process of claim 8, wherein the liquid reaction product withdrawn from the flashing has a mole ratio of propylene groups from 1,3-propanediol to terephthalate groups of less than about 1.5.

11. The process of claim 7, wherein the higher molecular weight poly(trimethylene terephthalate) has a relative viscosity of at least about 17.

12. The process of claim 8, wherein the higher molecular weight poly(trimethylene terephthalate) has a relative viscosity of at least about 17.

13. The process of claim 9, wherein the higher molecular weight poly(trimethylene terephthalate) has a relative viscosity of at least about 17.

14. The process of claim 10, wherein the higher molecular weight poly(trimethylene terephthalate) has a relative viscosity of at least about 17.

15. The process of claim 14, wherein the higher molecular weight poly(trimethylene terephthalate) has a relative viscosity of at least about 35.

16. The process of claim 15, wherein the higher molecular weight poly(trimethylene terephthalate) has a relative viscosity of at least about 40.

17. The process of claim 16, wherein the higher molecular weight poly(trimethylene terephthalate) has a relative viscosity of at least about 45.

18. The process of claim 17, wherein the higher molecular weight poly(trimethylene terephthalate) has a relative viscosity of at least about 50.

19. A process comprising:
 (a) continuously flashing a liquid feed mixture comprising a catalyst and at least one of bis-3-hydroxypropyl terephthalate and low molecular weight polyesters containing propylene groups from 1,3-propanediol and terephthalate groups, thereby forming first gaseous by-products and liquid reaction product;
 (b) continuously removing the gaseous by-products from the flashing;
 (c) continuously withdrawing liquid reaction product from the flashing;
 (d) continuously prepolymerizing the liquid reaction product to form poly(trimethylene terephthalate) prepolymer and second gaseous by-products;
 (e) continuously withdrawing poly(trimethylene terephthalate) prepolymer from the prepolymerizing;
 (f) continuously polymerizing the poly(trimethylene terephthalate) prepolymer to form a higher molecular weight poly(trimethylene terephthalate) and third gaseous products; and
 (g) continuously withdrawing the higher molecular weight poly(trimethylene terephthalate) from the polymerization.

20. The process of claim 19, wherein the liquid feed mixture has a mole ratio of propylene groups from 1,3-propanediol to terephthalate groups of 1.1 to 2.2.

21. The process of claim 19, wherein the liquid reaction product withdrawn from the flashing has a mole ratio of propylene groups from 1,3-propanediol to terephthalate groups of less than about 1.5.

22. The process of claim 20, wherein the liquid reaction product withdrawn from the flashing has a mole ratio of propylene groups from 1,3-propanediol to terephthalate groups of less than about 1.5.

23. The process of claim 19, wherein the higher molecular weight poly(trimethylene terephthalate) has a relative viscosity of at least about 17.

24. The process of claim 20, wherein the higher molecular weight poly(trimethylene terephthalate) has a relative viscosity of at least about 17.

25. The process of claim 21, wherein the higher molecular weight poly(trimethylene terephthalate) has a relative viscosity of at least about 17.

26. The process of claim 22, wherein the higher molecular weight poly(trimethylene terephthalate) has a relative viscosity of at least about 17.

27. The process of claim 26, wherein the higher molecular weight poly(trimethylene terephthalate) has a relative viscosity of at least about 35.

28. The process of claim 27, wherein the higher molecular weight poly(trimethylene terephthalate) has a relative viscosity of at least about 40.

29. The process of claim 28, wherein the higher molecular weight poly(trimethylene terephthalate) has a relative viscosity of at least about 45.

30. The process of claim 29, wherein the higher molecular weight poly(trimethylene terephthalate) has a relative viscosity of at least about 50.

31. The process according to claim 19, wherein the first gaseous by-products are continuously removed from the flasher and condensed, the second gaseous by-products are continuously removed from the prepolymerizer and condensed, and the combined first and second condensed by-products contain not more than 100 ppm by weight of acrolein and not more than 600 ppm of allyl alcohol.

32. The process according to claim 31, wherein the combined first and second condensed by-products contain not more than 60 ppm by weight of acrolein and not more than 400 ppm of allyl alcohol.

33. The process according to claim 31, wherein the combined first and second condensed by-products contain not more than 40 ppm by weight of acrolein and not more than 250 ppm of allyl alcohol.

34. The process according to claim 19, wherein the third gaseous by-products are continuously removed from the final polymerizer and condensed, and the third condensed by-products contain not more than 200 ppm of acrolein and not more than 3000 ppm of allyl alcohol.

35. The process according to claim 34, wherein the third condensed by-products contain not more than 100 ppm of acrolein and not more than 2500 ppm of allyl alcohol.

36. The process according to claim 34, wherein the third condensed by-products contain not more than 70 ppm of acrolein and not more than 1000 ppm of allyl alcohol.

37. A continuous process for the production of poly(trimethylene terephthalate) comprising the steps of:
   (a) continuously flashing a liquid feed mixture, the liquid feed mixture comprising a catalyst and at least one of bis-3-hydroxypropyl terephthalate and low molecular weight polyesters containing propylene groups from 1,3-propanediol and terephthalate groups, and the liquid feed mixture having a mole ratio of propylene groups from 1,3-propanediol to terephthalate groups of 1.1 to 2.2;
   (b) continuously vaporizing by-products in the flashing and removing the by-products from the flashing in a first stream of gaseous by-products, and continuously withdrawing a liquid flasher reaction product having a mole ratio of propylene groups from 1,3-propanediol to terephthalate groups of less than about 1.5 from the flashing;
   (c) continuously prepolymerizing the liquid flasher reaction product to form a poly(trimethylene terephthalate) prepolymer and a second stream of gaseous by-products;
   (d) continuously withdrawing the poly(trimethylene terephthalate) prepolymer from the prepolymerizer;
   (e) continuously polymerizing the poly(trimethylene terephthalate) prepolymer to form a higher molecular weight poly(trimethylene terephthalate) and a third stream of gaseous by-products; and
   (f) continuously withdrawing the higher molecular weight poly(trimethylene terephthalate) from the final polymerizer, the higher molecular weight poly(trimethylene terephthalate) having a relative viscosity of at least about 17.

* * * * *